United States Patent [19]

Wyeth

[11] 4,294,279

[45] Oct. 13, 1981

[54] FUEL TANKS

[75] Inventor: Harold W. G. Wyeth, Fleet, England

[73] Assignee: The Secretary of State for Defence in Her Britannic Majesty's Government of the United Kingdom of Great Britain and Northern Ireland, London, England

[21] Appl. No.: 44,160

[22] Filed: May 31, 1979

[30] Foreign Application Priority Data

May 31, 1978 [GB] United Kingdom ............... 24761/78

[51] Int. Cl.³ ............................................ B64D 37/08
[52] U.S. Cl. .................................... 137/264; 137/565; 137/587; 220/85 S; 220/88 R; 220/900; 244/135 R
[58] Field of Search ............... 220/20.5, 21, 855, 88 R, 220/900; 137/264, 565, 515, 588, 587; 280/5 R, 5 G, 5 A; 244/135 R

[56] References Cited

U.S. PATENT DOCUMENTS

| 984,255 | 2/1911 | Anderson | 244/135 R |
|---|---|---|---|
| 2,023,189 | 12/1935 | Armstrong | 137/515 |
| 2,146,729 | 2/1939 | Gavin | 244/135 R |
| 2,305,923 | 12/1942 | Held | 220/88 R |
| 2,407,515 | 9/1946 | Roberts | 220/900 |
| 2,719,583 | 10/1955 | Malick | 137/264 |
| 2,802,332 | 8/1957 | Orsino | 220/21 |
| 2,850,083 | 9/1958 | Frost | 244/135 R |
| 3,506,224 | 4/1970 | Harr et al. | 220/900 |
| 3,536,108 | 10/1970 | Schreiber | 137/588 |
| 3,650,431 | 3/1972 | Stewart | 220/900 |
| 3,664,904 | 5/1972 | Cook | 220/900 |
| 3,691,620 | 9/1972 | Harr | 220/88 R |
| 3,764,035 | 10/1973 | Silverman | 220/88 R |
| 3,782,588 | 1/1974 | Allen | 220/88 R |
| 3,787,279 | 1/1974 | Winchester | 244/135 R |
| 3,804,292 | 4/1974 | Chiti | 137/264 |
| 3,896,964 | 7/1975 | Takei et al. | 220/88 R |

FOREIGN PATENT DOCUMENTS

| 1095131 | 12/1960 | Fed. Rep. of Germany ... 244/135 R |
|---|---|---|
| 363591 | 12/1931 | United Kingdom ............ 244/135 R |
| 577457 | 5/1946 | United Kingdom . |
| 579421 | 8/1946 | United Kingdom . |
| 609314 | 9/1948 | United Kingdom . |
| 1254642 | 11/1971 | United Kingdom . |
| 1453836 | 10/1976 | United Kingdom . |

Primary Examiner—William R. Cline
Assistant Examiner—H. Jay Spiegel
Attorney, Agent, or Firm—Cushman, Darby & Cushman

[57] ABSTRACT

A fuel tank largely filled with a plurality of discrete impermeably walled cells, the cells and the space between them and the tank sides and roof being substantially filled with fire protective reticulated structure. The cells are each plugged into one of a plurality of fuel collection networks, via non-return valves which prevent return flow of the fuel into the cells. The region between the cells and the tank walls is arranged to receive incoming fuel which then flows from the ullage into the cells, and, by means of a self switching pump, is also arranged to empty preferentially. The purpose of the invention is to minimize fuel loss and fuel fire in the event of a tank rupture.

27 Claims, 3 Drawing Figures

FUEL TANKS

The present invention relates to fuel tanks. It is particularly concerned with military aircraft fuel tanks, but may be suitable for incorporation in any static and vehicle or craft fuel tanks.

It is customary for military aircraft fuel tanks to have what is called a self-sealing facility. Typically this comprises natural rubber within the wall so that if the wall is punctured the rubber swells under the influence of the fuel and blocks the puncture.

Self-sealing fuel tanks have been employed in aircraft for many years but have always had disadvantages due to fuel managing to gain some access to the natural rubber when the tank has not been punctured and thus diminishing the effectiveness of the natural rubber in the event of a puncture and, in any case, due to a time lag between the occurrence of a puncture and the blocking by the swollen rubber permitting loss of a considerable quality of fuel and increasing the risk of fire.

By the present invention is provided a fuel tank the fuel loss wherefrom is minimised in the event of a puncture.

According to the present invention a fuel tank has a plurality of substantially impermeably walled cells extending substantially from the floor toward the ceiling thereof, each cell containing a fire protective reticulated structure, and each cell having an outlet approximate the bottom thereof, collection means ducting each cell outlet to at least one common tank outlet, and non-return valves arranged to prevent fuel flow from the collection means into the cells.

According to a preferred feature of the invention each cell is discrete, and is detachable from within the fuel tank, and replaceable. A typical cell may thus be of such interfitting section, eg triangular, rectangular, hexagonal, that the cells may be arranged within a tank substantially without voids between them. The impermeable envelope forming the cells may comprise flexible material, such as plastics film, and open at the designated top end and have an outlet at the designated bottom end.

It will be appreciated that for the purposes of the present specification a reticulated structure is a threedimensionl structure which is perforated in the three dimensions. The reticulated structure may be constituted by reticulated polyurethane ether or ester foam, a chemically or thermally bonded non-woven structure of fibrous plastics material for example nylon, or even formed of filamentary or perforated laminatory metal.

Reticulated structures used with cell walled with plastics membrane are preferably, non abrasive. Plastics structures can, as can the plastics membrane, confer weight and volume advantages. Particularly suitable fire protective reticulated structures include melded fibre structures described in UK Patent Specification No. 1453836 and those sold by Imperial Chemical Industries under the Trade Name 'Promel'.

It is preferable that the reticulated structure imparts the shape to the cell and supports the envelope, for then the envelope need only be made of a film or membrane material, albeit one which is mechanically strong and not physically incompatible with the structure or the fuel, separately or combined or at the usual operating temperatures. Suitable film or membrane includes the co-extrusion of polyvinyl chloride with low density polyethylene sold by Dow Chemical Ltd under the Trade Mark 'Saranex', the film of polyethylene nylon, polypropylene, terephthalate overcoated with polyvinylidene chloride sold by ICI under the trade Mark 'Melinex', and the film sold by Dow Chemicals Ltd under the Trade Name Saran. The film may carry a low friction outer layer to assist in removal and replacement of individual cells. In tanks of certin dimensions the cells, or at least an upper portion thereof may be supported or restrained against the effects of fuel slopping, by distance pieces or dividers attached to the tank walls.

If the reticulated structure is formed of a resilient material it may be of value that it be compressed within the envelope. Expansion of the structure toward the wound in the event of a punctured cell wall may assist in resisting the exodus of fuel from the cell. A 10% compression appears suitable.

If the structure is formed of filamentary material then if the puncture is caused by a projectile the projectile and fluid shock are likely to cause filaments substantially to plug the puncture. The emplacement of the envelope over the structure during manufacture may be obtained by shrink wrapping.

The reticulated structure may be hollow even if compressed, to minimise the loss of effective fuel tank volume. Whilst it is possible that a hollow space extending from bottom to top of the reticulated structure may accommodate fuel contents gauging it is more probable that this can be satisfactorily effected by means of a capacitor gauge in one cell in a central region of the tank. It may be a safe assumption that the cells will all empty substantially evenly. Since, however, the tank may also have to be fitted with such equipment as a float switch, a refuelling valve, a vent or return from whatever collection system is used to convey fuel from the cells to the fuel system apparatus, it may be preferred to have a region which is devoid of one or more cells.

To assist drainage the bottom end of each cell may be tapered towards the outlet. The mean diameter of each cell may be 75–150 mm.

The collection means for collecting fuel from each cell may advantageously comprise a network of plastics tubing. Each cell may be linked to the collection means by a plug and socket arrangement permitting the withdrawal and replacement of the cells. The collection means preferably have sufficient rigidity to permit connection thereto of the cells without requiring manipulation of the collection means. The collection means may be attached to the floor of the tank at points other than the outlet. Some degree of positive retention of a plug within a socket is preferred but this need be no more than can be obtained by pushing the cells from the top end or than can be separated by pulling the top and without dislocating the network, since in the preferred embodiment some seepage of fuel from the cell into the base area may be tolerable. The non-return valve may be sited in the plug or socket and may consist of a simple disc valve. It may also include a float member to restrict the passage of air through the valve when the cell is empty, thus diminishing the effect of uneven emptying.

The collection means may alternatively comprise a collection plenum chamber, though a network has the advantage of reducing the likelihood of projectile damage to the collection means and hence fuel loss and fire, by minimisation of the presented area. The effect of such damage can further be minimised if the collection means comprises a plurality of distinct collectors, be they chambers or networks etc.

According to a feature of the invention the cell sides may be distanced from the tank walls, perhaps by discreet support members or dividers perhaps by a fire protective reticulated structure or structures.

The reticulated structure, and it may be used substantially to fill the region between the cells and the tank walls even if other cell support means are used, may be any of those described above as suitable for use within the cell. The region thus formed surrounding the cells may have a distinct fuel outlet system. If this comprises a self switching pump then the region surrounding the cells can be arranged to be emptied preferentially. Such an arrangement confers the advantage that in the event of a rupture of a fuel tank side wall by a projectile which also damages one or more cells fuel leaked from the cells will tend to be collected by the regions distinct fuel outlet system and passed to the engines by the self switching pump rather than leaked from the tank.

The cells are also preferably distanced from the top of the tank, so that an ullage of 2–5% tank volume is formed. As it is preferred to fill fuel tanks from the bottom incoming fuel will, in the preferred embodiment, fill the region surrounding the cells first and then run into the cells, finally filling the ullage. By virtue of the self switching pump the said surrounding region empties preferentially.

The collection means may have non-return valves permitting entry of fuel thereto from the said surrounding region. These permit early priming of the engine supply plumbing and act as fail-safe devices with respect to the self switching pump if fitted.

The collection networks, if employed may be surrounded by or embedded in a reticulated structure, but as an explosion is less likely there compared with higher in the tank, the weight and volume penalty incurred by so doing may make this provision relatively disadvantageous.

There are basically two kinds of aircraft fuel tank, bag tanks and integral tanks. The present invention is suitable for use with either. While the whole fuel tank wall may be of a self seal construction it is an advantage in the preferred embodiment of the invention for only the base of the tank to be of such a construction. It will also be appreciated that a fuel tank may, for the purposes of the present specification, be a container of any flammable fluid, though the value of the invention will be realised predominantly if containing propulsion fuels.

The invention confers the following advantages on craft and vehicle fuel tanks. It minimises slopping across the tank and imparts a high degree of fire and explosion suppression to the tank. In the event of tank rupture only fuel above the rupture in the tank other than in the cells and within the cells above the damage inflicted to those cells, will have any access to the rupture. That access will however be impeded by the reticulated structure and any mess of impermeable walling. Moreover the hydraulic shock generated in the fuel by the rupture, which is apt to aggravate both the rupture and the exodus of fuel, will be somewhat attenuated due to the invention. In the preferred embodiment of the invention damage to a tank following a projectile piercing the side wall of a tank is likely to result in substantially no loss of fuel. If it pierces the floor it may not encounter a fuel collector and pierce one or two cells only, when a small amount of fuel will be lost from the tank until the self seal facility has activated, though much of the fuel thus derived from the cells will be pumped preferentially to the engines by the self switching pump. The amount of fuel lost if the fuel collector is penetrated will depend on the location and size of the penetration.

Damaged cells may be readily replaced. Apparatus according to the invention may readily be fitted to an existing fuel tank as a retrofit.

An aircraft fuel tank in accordance with the invention will now be described by way of example with reference to the accompanying drawing of which:

Figure 1:
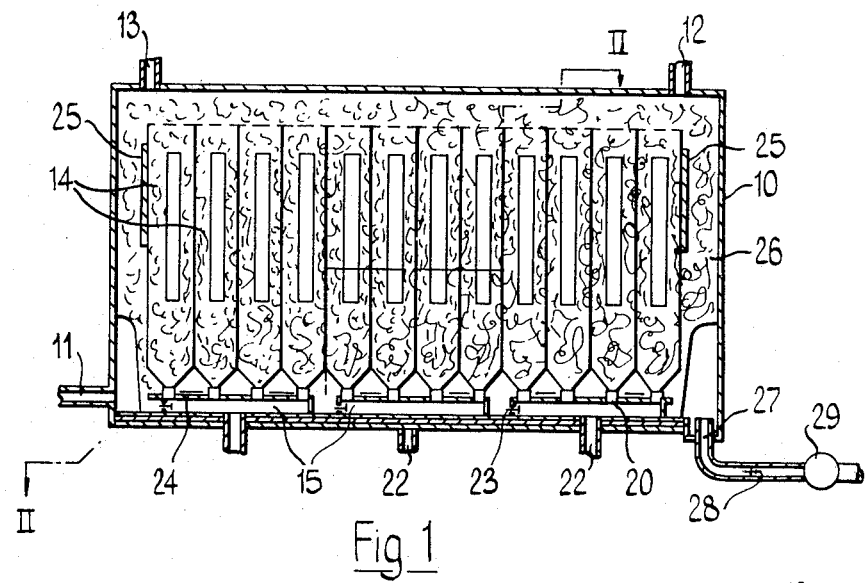
FIG. 1 is a vertical plane cross-section of the fuel tank.
Figure 2:
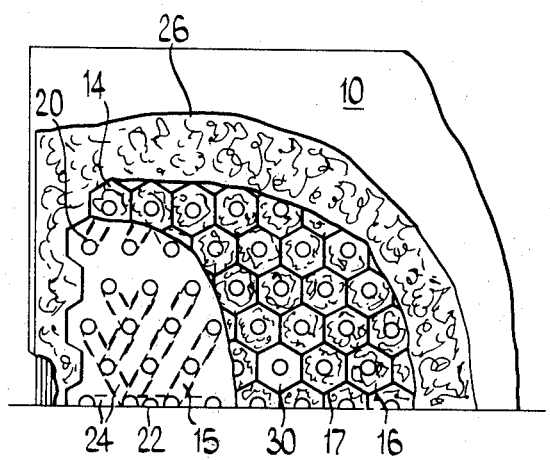
FIG. 2 is a view on II—II in FIG. 1.

The fuel tank shown in FIGS. 1 and 2 comprises a bag 10 with a fuel inlet 11, a vent 12 and a pressurizing supply inlet 13. It contains, in uniform close-packed hexagonal array a plurality of cells 14 which each extend vertically from a collector array 15 to approximate a roof portion of the bag 10. The floor of the bag 10 has a self sealing facility.

Figure 3:
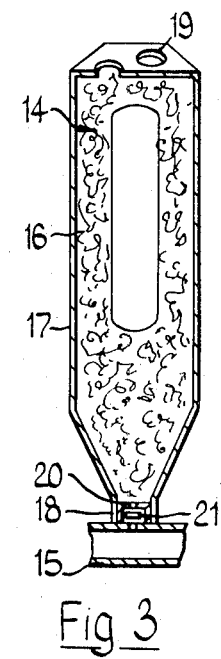
FIG. 3 is a view of a cell.

As shown in FIG. 3 each cell 14 comprises a fire protective reticulated structure 16 of hexagonal section and an envelope 17 enclosing the structure 16. At its bottom end the cell 14 tapers down to a plug 18. The structure 16 is hollow and the envelope 17 has a plurality of openings 19 at its top end.

The collector array 15 comprises a plurality of networks of collection tubes having sockets 20 for the plugs 18. The sockets 20 each contain a non-return valve 21. Each network has a fuel outlet 22 and a non-return valved inlet 23 from the region of the tank surrounding it. Although the network is formed of plastics tubing with a degree of intricate rigidity it is also retained to the floor of the tank at various stations by clips 24, so that the cells can be plugged into the collectors without the collectors requiring manipulation.

The array of cells 14 is distanced from the side walls and roof of the bag 10. Dividers 25 restrain the cells against fuel slopping, while the ullage, about 3% of tank volume, and the region between the cells and the tank wall are fitted with fire protective reticulated structure 26. This region has its own outlet 27 with a non-return valve 28 and a self switching pump 29.

A relatively central cell 30 accommodates a fuel gauge sensor, while a void in the structure 26 accommodates a float swtich (not shown).

In manufacture the reticulated structure 16 of each cell is resilient and formed of a plastics material to the shape shown but 10% oversize. A sleeve of the envelope material, a strong, fuel resistant plastics material having at its outer surface a low coefficient of friction, and of the required mean diameter, is held open while the structure 15, mechanically compressed, is fed into it. The sleeve is cut, seamed at the top end and sealed into a plug 18 at the bottom end. The holes 19 are then made in the envelope 17 thus formed. The plug 18 has a resilient, convex engagement wall formed so as to be retained by the socket 20. By virtue of the resilient flexibility of the cells they can be emplaced from above by manually holding the plug 18. Some seepage of fuel from the plug and socket when engaged is tolerable.

In use of a liquid fuel tank as described and illustrated fuel is introduced to the tank via the inlet 11. The region surrounding the cells and by virtue of the non-return valves 23, the networks of tubes 15, are filled before fuel enters the cells 14 via the holes 19. When the tank is full the float switch cuts off the fuel supply. The tank is then pressurised at 13. When fuel is first demanded from the tank the self switching pump 29 operates and fuel is drawn from the outlet 25 preferentially. When the region surrounding the cells is empty the pump 29 switches off and fuel continues to be drawn from the cells 14 via the network tubes 15 and the outlets 22.

If the tank side wall is ruptured before the region surrounding the walls is empty some fuel may be lost; if after, and no cell 14 is ruptured, then fuel may only be lost (apart from by evaporation) in certain aircraft attitudes and accelerations. If one or more cells 14 are ruptured as well fuel above the cell rupture will leak preferentially into the said surrounding region and cause the pump 29 to operate, so that at least some fuel will be salvaged. If the bottom of the tank should be penetrated by, say, a projectile, the amount of fuel lost will depend on when, whether and how it damages any network of tubes 15, and whether any cell 14 is also penetrated, but if some fuel gains access to the rupture in the floor the self seal facility will activate in an effort to stem the flow. The reticulated structure serves to protect the interior of the fuel tank from explosion and fire, in addition to presenting the cellular structure of the tank interior, and also to reduce hydraulic shock arising from projectile impact which might otherwise increase the size of the rupture.

In a preferred embodiment the reticulated structures 16 and 26 are formed of melded fibres as described in UK Pat. No. 1453836 the fibres having a decitex within an elevated part of the range therein quoted, eg 25-50 decitex. The envelope 17 comprises a sleeve of the film of polyethylene terephthalate overcoated with polyvinylidene chloride, eg that sold by ICI under the trade name Melinex. The cells measure 120 mm across the flats.

An added advantage of this preferred construction is that the combined effects of projectile passage and fuel shock tends to force plugs of fibres from the reticulated structures into the tank wall rupture to assist in resealing it.

I claim:

1. A tank for liquid fuel and containing
   a plurality of cells for containing fuel and each extending substantially from the floor of the tank to the ceiling thereof,
   collection means, in the bottom of said tank, for collecting fuel from said cells and supplying it to at least one common tank outlet,
   plug and socket means for mounting and detaining said cells in said tank and connecting said cells to said collection means, and
   non-return valves preventing fluid flow from said collection means into said cells,
   each of said cells being distinct and individually detachable from said tank and comprising an envelope of impermeable flexible material surrounding a resilient fire protective reticulated structure, said envelope being open at a top end thereof and having an outlet at the bottom thereof, and there being an ullage between the top of said cells and the roof of said tank, said ullage being substantially filled with at least one fire protective reticulated structure.

2. A fuel tank as claimed in claim 1 and wherein each said cell is of such interfitting section that said cells can be arranged in said tank without voids between them.

3. A fuel tank as claimed in claim 1 and wherein said envelope is formed of plastics film.

4. A fuel tank as claimed in claim 1 wherein the reticulated structure within each of said cells is compressed by said envelope.

5. A fuel tank as claimed in claim 1 and wherein said reticulated structures define a hollow portion therewithin.

6. A fuel tank as claimed in claim 1 and wherein the bottom end of each said cell is tapered toward the outlet thereof.

7. A fuel tank as claimed in claim 1 and wherein each cell has a mean diameter of 75-150 mm.

8. A fuel tank as claimed in claim 1 and wherein said collection means comprises a network of tubing.

9. A fuel tank as claimed in claim 8 wherein said network of tubing is monoplanar.

10. A fuel tank as claimed in claim 1 wherein said plug and socket means comprises a plug mounted on each of said cells and forming the outlet thereto, and a plurality of sockets mounted on said collection means for receiving said plugs.

11. A fuel tank as claimed in claim 10 and wherein said non-return valves are sited in said sockets.

12. A fuel tank as claimed in claim 1 and wherein said collection means comprises a plurality of distinct collectors.

13. A fuel tank as claimed in claim 1 and wherein said cells are distanced from the sides of the tank.

14. A fuel tank as claimed in claim 13 and wherein the region thus formed between said cells and said tank contains fire protective reticulated structure means.

15. A fuel tank as claimed in claim 13 and wherein the region thus formed between said cells and said tank sides has a distinct fuel outlet.

16. A fuel tank as claimed in claim 15 and wherein said distinct fuel outlet is controlled by a self-switching pump.

17. A fuel tank as claimed in claim 16 and wherein the fire protective reticulated structure is formed of bonded plastics fibres.

18. A fuel tank as claimed in claim 15 wherein said ullage communicates with said region between the cells and the tank sides, whereby the fuel tank and cells can be filled by pumping fuel into said region.

19. A fuel tank as claimed in claim 1 wherein said ullage comprises 2-5% of the tank volume above said cells.

20. A fuel tank as claimed in claim 1 and wherein said collection means have non-return valves permitting entry thereto from regions outside said cells but inside said tank.

21. A fuel tank as claimed in claim 1 and wherein the tank floor has a self-seal facility.

22. A fuel tank as claimed in claim 1 and wherein the fire protective reticulated structure is formed of bonded plastics fibres.

23. A fuel tank as claimed in claim 1 and wherein the fire protective reticulated structure is formed of bonded plastics fibres.

24. A fuel tank as claimed in claim 1 and wherein said collection means are arranged to permit connection thereto of said cells without requiring manipulation of said collection means.

25. A fuel tank as claimed in claim 1 wherein said collection means is substantially rigid.

26. A tank for liquid fuel and containing
   a plurality of cells for containing fuel and each extending substantially from the floor of said tank to the ceiling thereof, and collection means in the bottom of said tank and for collecting fuel from said cells and supplying it to at least one common tank outlet, each said cell being distinct and individually detachable from said tank and comprising an envelope of impermeable flexible material surrounding and compressing a resilient fire protective reticulated plastics structure, said envelope being open at a top end thereof and sealed to an outlet plug at the bottom end thereof, and each said cell having an interfitting section such that cells can be arranged in said tank substantially without void, between them, and said collection means comprising a network of tubing carrying an array of sockets, said sockets being adapted detachably to detain said plugs and containing non-return valves arranged to permit fluid flow from said cells into said collection means and to fluid flow from said collection means into said cells, and there being provided an ullage between said cells and the ceiling of said tank and said cells being distanced from the side walls of said tank, said ullage and the region between said side walls and said side cells being substantially filled with at least one fire protective reticulated plastics structure, and said ullage communicating with the region between said side walls and said cells whereby said tank and said cells can be filled by pumping fuel into said ullage.

27. A tank for liquid fuel and containing a plurality of cells for containing fuel and each extending substantially from the floor of said tank to the ceiling thereof, and collection means in the bottom of said tank and for collecting fuel from said cells and supplying it to at least one common tank outlet, each said cell being distinct and individually detachable from said tank and comprising an envelope of impermeable plastics film surrounding and compressing a resilient fire protective reticulated plastics structure, said envelope being open at a top end thereof and sealed to an outlet plug at the bottom end thereof, and each cell having an interfitting section such that cells can be arranged in said tank substantially without voids between them, and said collection means comprising a plurality of substantially rigid networks of tubing carrying an array of sockets, said sockets being adapted detachably to detain said plugs and containing non-return valves arranged to permit fluid flow from said cells into said collection means and to prevent fluid flow from said collection means into said cells, there being provided an ullage between said cells and the ceiling of said tank and said cells being distanced from the side walls of said tank, said ullage and the region between said side walls and said cells being substantially filled with at least one fire protective reticulated plastics structure, and said ullage communicating with the region between said side walls and said cells whereby said tank and said cells can be filled by pumping fuel into said ullage, an outlet in the bottom of said tank but outside said cells, a self-switching pump associated with said outlet and arranged to operate preferentially with respect to said collection means, and self seal means associated with at least the bottom of said tank.

* * * * *